United States Patent [19]

St. Jacques

[11] 4,006,628
[45] Feb. 8, 1977

[54] MAGNETIC INDUCTION TYPE TRANSDUCER MEANS

[75] Inventor: Gerald A. St. Jacques, Germantown, Ohio

[73] Assignee: NCR Corporation, Dayton, Ohio

[22] Filed: Nov. 19, 1975

[21] Appl. No.: 633,327

[52] U.S. Cl. .......................... 73/141 A; 73/43 LR; 336/134

[51] Int. Cl.² .......................................... G01L 5/00

[58] Field of Search .................. 73/141 A, 432 R; 336/134, 132

[56] References Cited

UNITED STATES PATENTS

| | | | |
|---|---|---|---|
| 2,674,721 | 4/1954 | Jackson et al. | 336/134 |
| 2,786,983 | 3/1957 | Hill | 336/134 |
| 3,528,295 | 9/1970 | Johnson et al. | 73/432 R |
| 3,609,615 | 9/1971 | Parker et al. | 336/83 |
| 3,621,720 | 11/1971 | Clark | 73/432 R |

FOREIGN PATENTS OR APPLICATIONS 421,353  12/1934  United Kingdom ............... 336/134

Primary Examiner—James J. Gill
Assistant Examiner—Anthony V. Ciarlante
Attorney, Agent, or Firm—J. T. Cavender; Albert L. Sessler, Jr.; Elmer Wargo

[57] ABSTRACT

A transducer for converting mechanical forces into corresponding electrical signals. In one embodiment, the transducer takes the form of a writing instrument for use in a user identification system whereby the time-varying force between the instrument and a writing surface generates a waveform which is characteristic of the individual doing the writing. The transducer includes first and second core members being interconnected by a resilient member with the core members being operatively coupled to a coil whose inductance varies in accordance with the forces generated during writing. The coil is operatively coupled to an oscillator whose frequency changes in accordance with the varying inductance to produce the waveform.

8 Claims, 7 Drawing Figures

MAGNETIC INDUCTION TYPE TRANSDUCER MEANS

BACKGROUND OF THE INVENTION

This invention relates to a transducer for converting mechanical forces into corresponding electrical signals, and in a preferred embodiment, it relates to a writing instrument and system capable of recording repeatable characteristics involved in an individual's signature or writing for use in automated user verification systems.

Recently, there has been an increasing trend towards using a record medium like a "credit card" in various business transactions. These transactions include the use of credit verification machines for credit purchases and automated banking teller machines, which among other transactions, include the dispensing of cash.

With an increasing reliance on the use of a "credit card" in business transactions, it is increasingly important to develop a commercially feasible system for verifying the identity of the person using the credit card. Some of the prior art user verification systems include the use of secret code numbers which are manually entered on a business machine like an automated banking teller machine, and signature verification systems.

Some of the prior art signature verification systems are shown in the following U.S. patents:
U.S. Pat. No. 3,528,295 which issued Sept. 15, 1970
U.S. Pat. No. 3,579,186 which issued May 18, 1971
U.S. Pat. No. 3,618,019 which issued Nov. 2, 1971 and
U.S. Pat. No. 3,621,720 which issued Nov. 23, 1971.

In general such signature verification systems include a writing instrument having a force transducer associated therewith for producing a substantially continuous time-varying electrical signal which is correlated to the varying force which an individual produces with the instrument during a normal writing process. Each individual appears to have a definite, repeatable pressure pattern for signing his name, for example, and such pressure patterns can be utilized in such systems for identification of the user of a "credit card" when it is presented for use by having the user sign his name with the writing instrument and by comparing the user's current pressure pattern with what has been previously recorded by him.

One prior art writing instrument utilizes a strain gauge for converting the pressure variations between a stylus included therein and a writing surface during the act of writing into electrical signals which correspond to the pressure variations.

One of the problems with a writing instrument which utilizes a strain gauge for converting the pressure variations into electrical signals is that the strain gauge is very susceptible to damage. If the writing instrument is to be used in a user identification system associated with an automated teller machine, for example, it may be dropped by a user or subject to vandalism, as these machines are often left unattended. Another problem with a strain gauge type writing instrument is that it is also temperature dependent. Because an automated teller machine, for example, may be installed in an outdoor open area and consequently be exposed to varying climate and temperature conditions, a strain-gauge type writing instrument used therewith would also be subjected to such varying conditions, making its output somewhat unreliable.

Another prior art writing instrument utilizes a differential transformer with a moveable core for converting the pressure patterns formed during the process of writing into corresponding electrical signals. This writing instrument is also expensive to produce, susceptible to damage, and may be susceptible to outside magnetic radiations or influence.

In contrast with the above, the transducer means of the present invention is very rugged, inexpensive to produce, provides sensitive readings, and is relatively immune to outside magnetic radiation or an unfavorable outdoor environment.

SUMMARY OF THE INVENTION

This invention relates to a transducer means for converting mechanical forces into corresponding electrical signals. The transducer means includes first and second core means mounted for movement relative to each other and a resilient means interconnecting the first and second core means. At least one of the first and second core means, when subjected to a force, transfers the force to the resilient means and moves relative to the other core means to change the inductive coupling between the first and second core means and the coil means to thereby provide a measure of the force applied. The coil means includes an oscillator means whose frequency changes in accordance with the change in inductance between the core means and the coil means. In a preferred embodiment, the transducer means of this invention is shown as part of a signature verification system, although this invention has other uses, as for example in weight loading systems.

BRIEF DESCRIPTION OF THE DRAWINGS

These advantages and uses of this invention will become more readily understood in connection with the following detailed description and drawings in which.

DETAILED DESCRIPTION OF THE INVENTION

Figure 1:
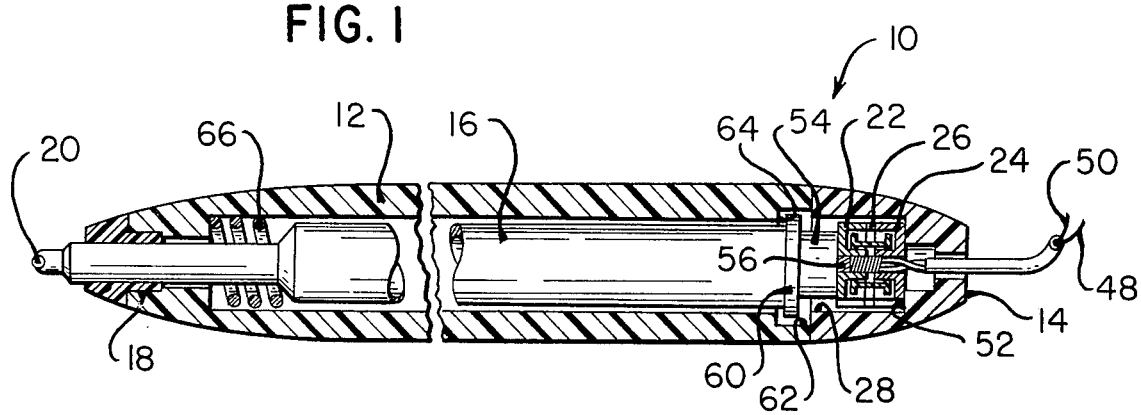
FIG. 1 is a side view, partly in cross section, of a preferred embodiment of the transducer means of this invention showing a writing instrument having a housing and first and second core means mounted therein for movement relative to each other, and a stylus for transferring the forces generated during a writing process to the first core means.

FIG. 1 is a side view, partly in cross section, of a first embodiment of the transducer means of this invention which is shown as a writing instrument or pen 10 which is part of a user identification system to be later described herein.

The pen 10 (FIG. 1) includes a housing, having a barrel portion 12, to be grasped by a user while writing, and an end portion 14 which is threadedly secured thereto. A stylus 16, which may be a ball point pen cartridge or other recording means, is slidably mounted in the barrel portion 12 by a suitable bearing 18 to enable the stylus 16 to be axially moved within the barrel portion 12 in responding to pressure variations resulting from the process of writing as the tip 20 of the stylus 16 contacts a writing surface.

The transducer means or pen 10 (FIG. 1) also includes a first core means 22, a second core means 24 and a resilient means 26 interconnecting the first and second core means 22, 24 which are located in a recess 28 in the end portion 14 of the pen 10.

Figure 2:
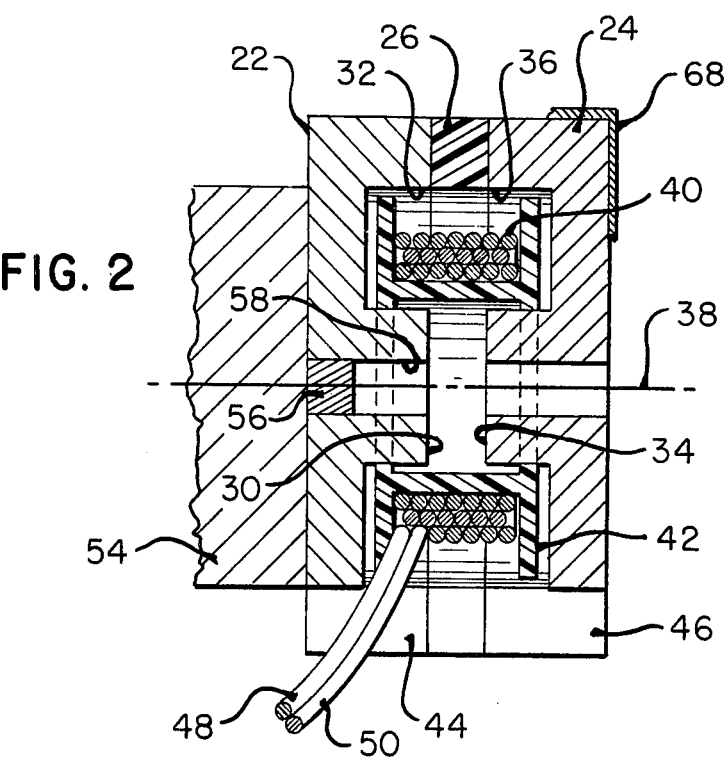
FIG. 2 is an enlarged view, partly in cross section, showing the first and second core means and a coil means positioned therebetween and a resilient means interconnecting the first and second core means and operating in a compressive mode.
Figure 3:
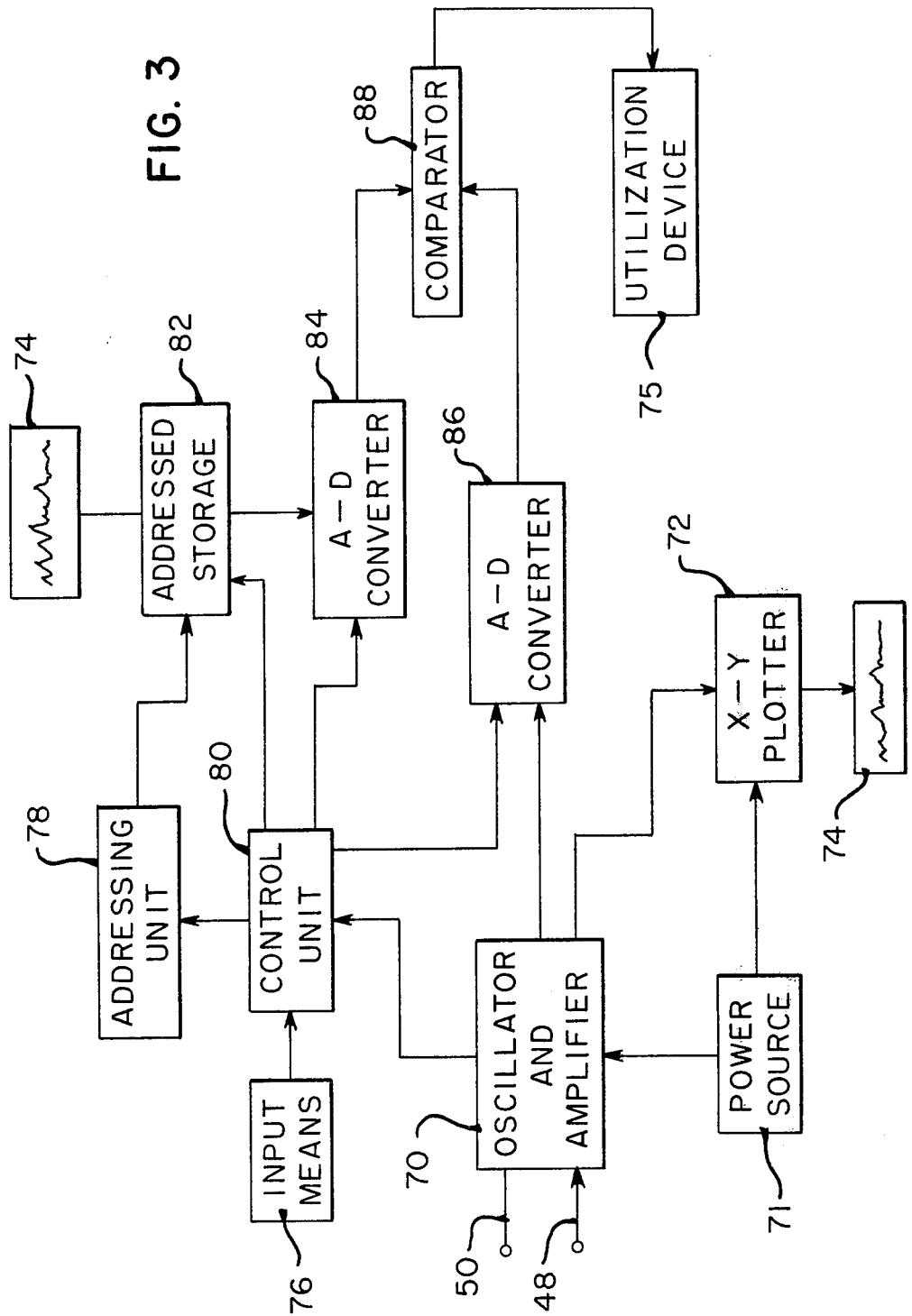
FIG. 3 is a schematic diagram, in block form, showing a user handwriting verification system.

The first and second core means 22, 24 are shaped relative to each other to receive an inductive means or a coil means therebetween and in the embodiment shown in FIGS. 1 and 2 they are identical. The first core means 22, for example, is a general, cylindrical section having a first face 30 in which an annular recess 32 is formed. The second core means 24 also has a first face 34 in which an annular recess 36 is formed. When the first and second core means 22, 24 are in the aligned relationship shown in FIGS. 1 and 2, the longitudinal axis 38 thereof is coincident with the longitudinal axis of the stylus 16 and the barrel portion 12, and the recesses 32 and 36 are aligned to form a cavity to receive the coil means which includes a coil 40. The coil 40 is wound on a plastic bobbin 42, and the first and second core means 22, 24 have suitable slots 44 and 46 (FIG. 2) therein to enable the leads 48 and 50 of the coil 40 to pass therethrough. The coil means also includes an oscillator means which is shown in FIG. 3 and which will be described hereinafter.

The resilient means 26 (FIGS. 1 and 2) which interconnects the first and second core means 22, 24 may be made of a variety of materials, depending upon the particular forces which the transducer means of this invention are to measure or detect, and the space available therefor. As an example, in the preferred embodiment of the pen 10 shown in FIG. 1, the resilient means 26 is made of a plastic material like urethane rubber and may be washer-like in shape to engage the outer perimeters of the faces 30, 34 of the first and second core means 22, 24 respectively and optionally be adhesively secured to these faces. In other embodiments the resilient means 26 may take the form of a resilient plastic material like silicon rubber RTV (which vulcanizes at room temperature) which fills the recesses 32 and 36 around the coil 40 and also fills the space between the outer perimeters of the faces 30 and 34. The diameter of the first and second core means 22, 24 and the outer diameter of the resilient means 26 are both approximately 0.360 inch in one embodiment of this invention. The thickness of the resilient means 26, when in the relaxed state, is approximately 0.020 inch. The particular pen 10 shown in FIGS. 1 and 2 is designed to handle writing forces of up to 100 grams, and the resilient means 26 is compressed up to about 0.010 inch when subjected to a writing force of 100 grams. The resilient means 26 is compressed in a linear manner when subject to increasing forces; however, it may be desireable in some situations to have a non-linear correlation between the forces applied thereto and the resulting deformations, and accordingly, the appropriate resilient means 26 could be selected to produce that type of correlation.

As stated earlier herein, the first and second core means 22, 24 are mounted for movement relative to each other. In the pen 10 shown in FIG. 1, this is accomplished by having the second core means 24 abut against a shoulder 52 in the end portion 14. The stylus 16 has an end portion 54 which abuts against the first core means 22 when in the assembled relationship shown in FIG. 1, and the end portion 54 may be provided with a cylindrical projection 56 which mates with a center hole 58 in the first core means 22 to center the stylus 16 thereon. The stylus 16 has an enlarged cylindrical section 60 which loosely fits into an annular recess 62 in the barrel portion 12 of the pen 10. The motion of the stylus 16 within the pen 10 is limited in one direction by the cylindrical section 60 abutting against a shoulder 64 in the barrel portion 12 and is limited in the opposite direction by a portion of the face of end portion 14.

In the embodiment shown in FIG. 1, the stylus 16 is the motion translating means which transfers the forces to be measured to the first core means 22. The stylus 16 is resiliently biased into engagement with the first core means 22 by a spring 66 so as to pre-load the resilient means 26. Generally, if a fast response is required, it is better to pre-load the resilient means 26 due to the fact that the response time (in returning to its relaxed condition) of the resilient means 26 becomes longer as it approaches its completely relaxed state when the forces being applied to the first core means 22 are removed therefrom.

The first and second core means 22, 24 may be made of ferrous materials; however, they appear to work best when made of ferrite material which provides for a high impedance with little eddy current losses. In general, when more sensitivity is required, the number of turns in the coil 40 can be increased, and the entire assembly including the first and second core means 22, 24, the coil 40, and the resilient means 26 may be encapsulated in a thin layer 68 of resilient plastic (shown only partially in FIG. 2) to seal the assembly from the environment. Also, because the shape of the first and second core means 22, 24 forms essentially a closed pole set, it is apparent that the transducer means of this invention is substantially impervious to outside magnetic radiation, thus forming a low-cost, rugged, sensitive transducer means. No exotic materials or processes are used in the construction thereof and the stylus 16 (which may be a ball point cartridge) can be easily replaced.

As alluded to earlier herein, the coil 40 is part of a coil means or inductive means which also includes a conventional oscillator and amplifier means 70 (FIG. 3) with a power source 71. The output leads 48, 50 of the coil 40 are coupled to the tank circuit of the oscillator section of the means 70 which oscillator section may be of the Colpitts variety. As the first and second core means 22, 24 (FIG. 1) are moved closer together by the stylus 16 during the act of writing, the inductance of coil 40 increases. Because the coil 40 forms a part of the tank circuit of the oscillator section, the coil inductance determines the oscillator frequency, and consequently, the oscillator frequency can be used as a measure of the force applied by the stylus 16. The output of the oscillator section may be fed into a conventional phase locked loop circuit like a Signetic NE565 manufactured by Signetics or National Semiconductor Corporation whose output swings between varying DC voltage levels as varying forces are applied by the stylus 16. The varying DC voltage levels may then be conventionally amplified and fed into a conventional X-Y plotter 72 which plots the varying voltage levels as a function of time to provide an analogue pressure pattern 74 of the individual doing the writing with the pen 10. The pressure patterns like 74 may be stored for future comparison in the automated user verification systems mentioned earlier herein by conventional techniques.

FIG. 3 also shows in block form a user verification system. Because the particular circuits employed may be conventional, as shown for example in the U.S. Pat. Nos. 3,579,186 and 3,618,019 cited earlier herein, the verification system shown in FIG. 3 will be described only generally.

Assume that the utilization device 75, shown in FIG. 3, is an automated teller machine and the pen 10, shown in FIG. 1, is used in conjunction therewith for user verification. An individual using the device 75 would insert a "credit card" into the input means 76 where his identification number is read thereby and routed to an addressing unit 78 via a control unit 80. The output of the addressing unit 78 is used to retrieve data (relative to the identification number) from an addressed storage unit 82. The data retrieved, shown graphically as a signature pressure pattern 74, (recorded earlier by the user) may be stored in unit 82 in analogue form and fed into an analogue-to-digital (A-D) converter 84. As part of the verification system, the user would also sign his name with the pen 10 (FIG. 1) and the output from the associated oscillator and amplifier 70 would then be fed into a second A-D converter 86. The outputs from the converters 84, 86 are then fed into a comparator 88 which compares the data representing the two signature pressure patterns to determine whether or not the current signature is within prescribed limits (for the identification number being checked), and therefore valid or not. In some situations it may be more advantageous to store the data in storage unit 82 in digital form rather than in analogue form. When the data stored in unit 82 is in digitial form, the A-D converter 84 could obviously be eliminated and the output from the storage unit 82 could be fed into the comparator 88.

Figure 4:
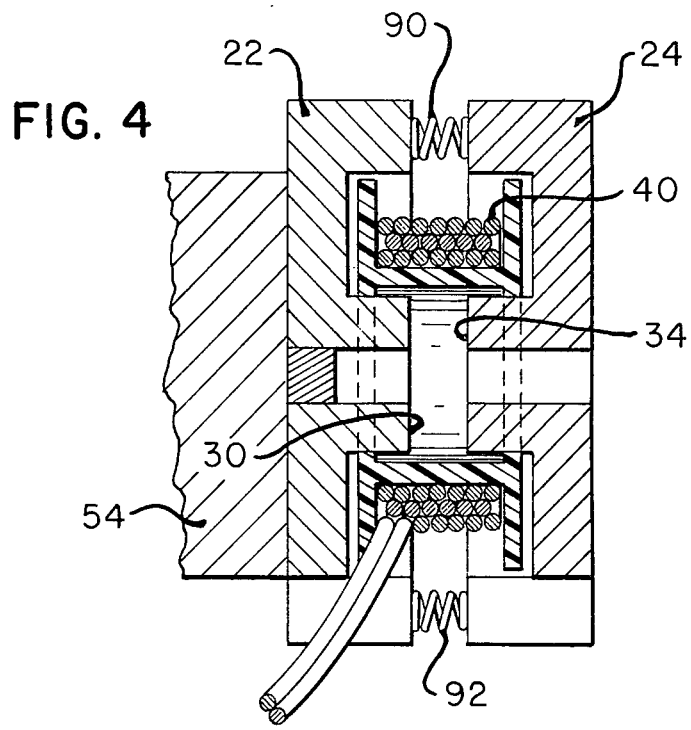
FIG. 4 is a view similar to FIG. 2 showing a resilient means in the form of a spring interconnecting the first and second core means.

FIG. 4 is a view which is identical to FIG. 2, except for the resilient means 26 interconnecting the first and second core means 22, 24; therefore like numbers will be used to identify identical parts. The resilient means shown in FIG. 4 comprises a plurality of springs like 90, 92 which are equidistantly spaced around the outer perimeters of the first faces 30, 34 of the first and second core means 22, 24 which may be provided with suitable recesses (not shown) to receive and locate the springs 90, 92. Naturally, the number of such springs 90, 92 and their strength are dependent upon the particular application in which the transducer means of this invention is used. As an alternate construction, where appropriate, the springs 90, 92 may be conventionally secured to the faces 30, 34 to operate in a tension mode.

Figure 5:
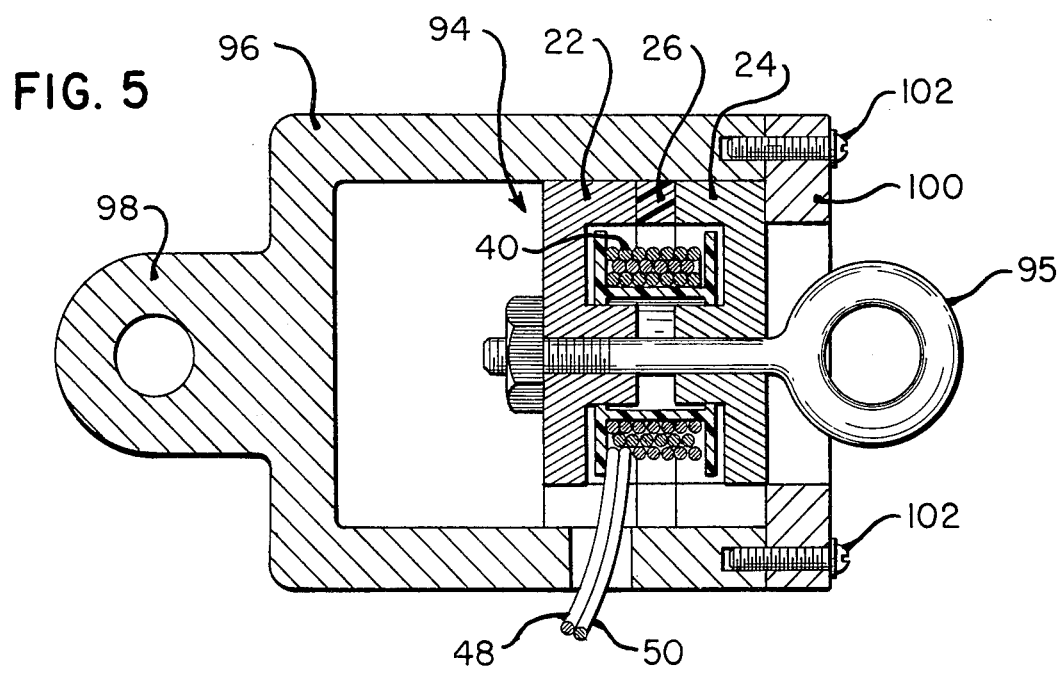
FIG. 5 is a cross-sectional view, similar to FIG. 2, showing how the embodiment shown in FIG. 2 can be operated in a tension mode.

FIG. 5 is a view similar to FIG. 2 showing how the embodiment used in FIG. 2 can be used to detect tension instead of pressure patterns. The transducer means designated generally as 94 is identical to that shown in FIG. 2 except that it has an eyebolt 95 slidably passing through the center thereof and that it is slidably received in a tubular cylindrical member 96 having an eyelet 98 formed in one end thereof. A washer-like plate 100 is detachably secured to the member 96 by fasteners 102 to retain the transducer means 94 within the cylindrical member 96. When the eyelet 98 and the eyebolt 95 are subjected to tension, the transducer means 94 will operate in the compressive mode as previously described.

Figure 6:
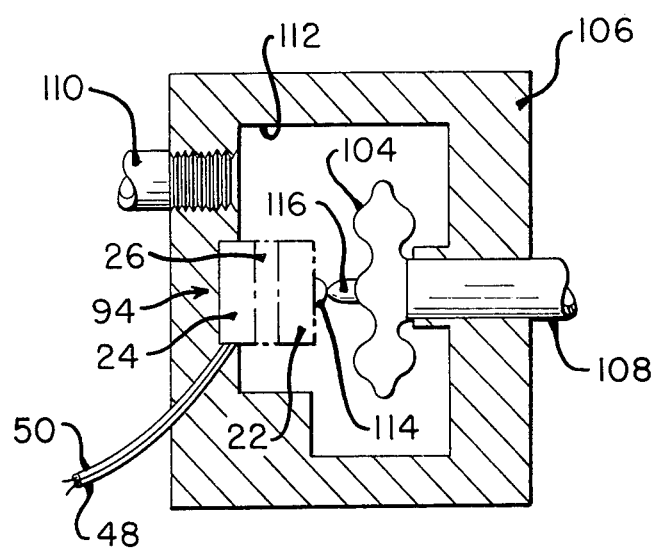
FIG. 6 is a cross-sectional view showing how the embodiment shown in FIG. 2 can be used in a differential pressure system.

FIG. 6 shows how the transducer means 94 can be used with a motion translating means which includes a bellows 104 which is located within a housing 106 to detect a differential pressure in a fluid system including gases or liquids operatively associated or coupled with the housing 106. The interior of the bellows 104 communicates with a first fluid inlet 108 located in the housing 106, and a second fluid inlet 110 communicates with the interior 112 of the housing 106. The transducer 94 shown in FIG. 6 could also be used to measure absolute pressure by venting inlet 110 to the atmosphere and by connecting inlet 108 to the source of fluid pressure to be measured. The transducer means 94 is modified to the extent that it may have a projection 114 extending from the first core means 22 to cooperate with a central projection member 116 extending from the bellows 104. As the bellows 104 expands and contracts due to the changing fluid pressures within the system shown in FIG. 6, the transducer means 94 will respond as previously described.

Figure 7:
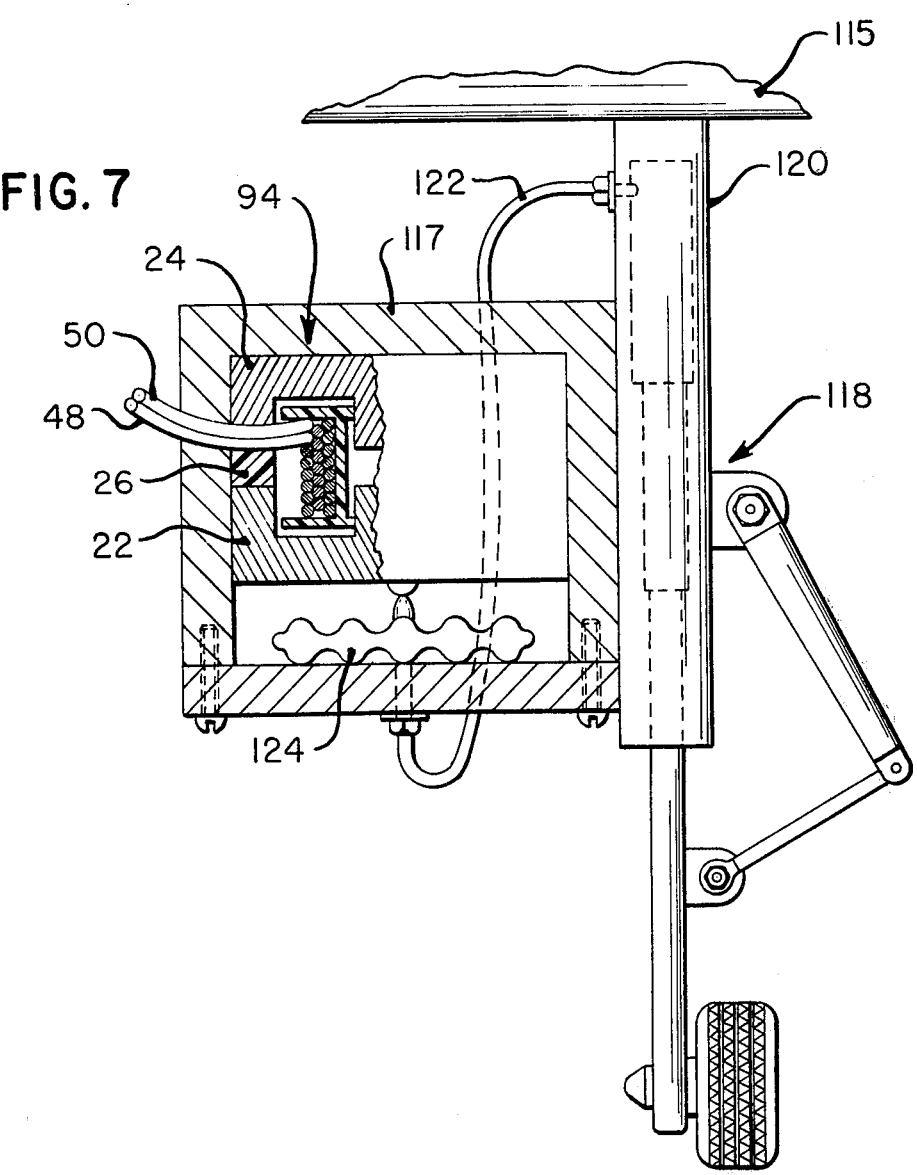
FIG. 7 is a schematic view, partly in cross section, showing how the embodiment shown in FIG. 6 can be used in a weight loading system for an airplane.

FIG. 7 is a simplified schematic view showing how the transducer means 94 of the type shown in FIG. 5 can be used in a weight loading system for a vehicle 115 like an airplane. The transducer means 94 may be mounted in a support 117 which may be secured to a conventional landing gear 118 of the airplane. As the static load on the landing gear 18 is increased, due to adding baggage, fuel, etc., fluid pressure in the cylinder 120 becomes greater and a conduit 122 in fluid connection therewith is fed into a bellows 124 which is operatively connected to the first core means 22 of the transducer means 94 as previously explained. An arrangement like that provided in FIG. 7 can be provided for each wheel or supporting structure of a vehicle to give an indication of how the loading of the vehicle is being effected or of the distribution of the load therein.

What is claimed is:

1. A transducer means for generating electrical signals which are proportional to varying forces to be measured comprising:

first and second core means being cylindrical in shape with each having an annular recess therein and being mounted for movement relative to each other;

a resilient means positioned between and interconnecting said first and second core means;

a coil means mounted in said annular recesses and coupled to said first and second core means;

force transmitting means operatively connected to one of said first and second core means to cause relative movement between said first and second core means by transferring said varying forces to said resilient means to thereby change the coupling between said first and second core means; and oscillator means coupled to said coil means whereby the frequency of said oscillator means changes in accordance with said varying forces to generate said electrical signals.

2. The transducer means as claimed in claim 1 in which said resilient means is an extendible means which is subjected to tension when said varying forces are applied.

3. The transducer means as claimed in claim 1 in which said first and second core means, said resilient means and said coil means are encapsulated in a layer of resilient plastic to form a sealed unit.

4. The transducer as claimed in claim 1 in which said force transmitting means includes link means.

5. The transducer as claimed in claim 1 in which said force transmitting means includes fluid means.

6. A transducer means including a stylus for generating electrical signals proportional to varying forces exerted on a surface during movement of said stylus in contact with said surface, said transducer means also comprising:

a housing adapted to be grasped by a user;

first and second core means being cylindrical in shape with each having an annular recess therein and being mounted for movement relative to each other in said housing;

a resilient means positioned between and interconnecting said first and second core means;

a coil means mounted in said annular recesses of and coupled to said first and second core means;

said stylus contacting one of said first and second core means to transfer said varying forces thereto to change the coupling between said first and second core means; and oscillator means coupled to said coil means whereby the frequency of said oscillator means changes in accordance with said varying forces to generate said electrical signals.

7. The transducer means as claimed in claim 6 in which said first and second core means, said coil means and said resilient means are encapsulated in a layer of resilient plastic to form a sealed unit.

8. The transducer means as claimed in claim 7 in which said resilient means is compressible and is made of an elastomeric material and is generally annular in shape, and in which said transducer means further comprises a second resilient means to bias said stylus into engagement with said first core means.

* * * * *